(12) United States Patent
Christen

(10) Patent No.: US 9,169,106 B2
(45) Date of Patent: Oct. 27, 2015

(54) COUPLING SYSTEM OF AN ELEVATOR CAR DOOR DRIVE

(75) Inventor: Jules Christen, Altdorf (CH)

(73) Assignee: Inventio AG, Hergiswil (CH)

( * ) Notice: Subject to any disclaimer, the term of this patent is extended or adjusted under 35 U.S.C. 154(b) by 688 days.

(21) Appl. No.: 13/379,225

(22) PCT Filed: Jun. 18, 2010

(86) PCT No.: PCT/EP2010/058657
§ 371 (c)(1),
(2), (4) Date: Mar. 19, 2012

(87) PCT Pub. No.: WO2010/146168
PCT Pub. Date: Dec. 23, 2010

(65) Prior Publication Data
US 2012/0168260 A1    Jul. 5, 2012

(30) Foreign Application Priority Data
Jun. 19, 2009  (EP) ..................... 09163291

(51) Int. Cl.
| | |
|---|---|
| B66B 13/12 | (2006.01) |
| B66B 13/08 | (2006.01) |
| F16G 3/00 | (2006.01) |
| E05F 15/643 | (2015.01) |

(52) U.S. Cl.
CPC .............. B66B 13/08 (2013.01); E05F 15/643 (2015.01); F16G 3/00 (2013.01); *E05Y 2201/652* (2013.01); *E05Y 2600/33* (2013.01); *E05Y 2900/104* (2013.01)

(58) Field of Classification Search
CPC ........ B66B 13/12; B66B 13/08; B66B 13/06; B66B 13/00; B66B 13/02; E05F 15/145; E05Y 2201/652; E05Y 2900/104

USPC ............ 187/319, 321, 264, 330; 49/118, 120
See application file for complete search history.

(56) References Cited

U.S. PATENT DOCUMENTS

| | | | | |
|---|---|---|---|---|
| 5,213,182 | A | * | 5/1993 | Guckert et al. ............... 187/315 |
| 5,517,180 | A | * | 5/1996 | Masi et al. .................. 340/573.1 |
| 6,702,066 | B1 | * | 3/2004 | Eaton ............................ 182/204 |

(Continued)

FOREIGN PATENT DOCUMENTS

| | | |
|---|---|---|
| DE | 4414065 C1 | 1/1996 |
| DE | 20 2005 006791 U1 * | 10/2006 |

(Continued)

*Primary Examiner* — William E Dondero
*Assistant Examiner* — Diem Tran
(74) *Attorney, Agent, or Firm* — Fraser Clemens Martin & Miller LLC; William J. Clemens

(57) ABSTRACT

A coupling system of an elevator car door drive includes a traction device, at least one coupling unit coupled to the traction device, and an adapter element which has a first interlocking adjustment structure which, together with interlocking elements of the traction device, forms a first interlocking unit that secures a relative position of the adapter element with respect to the traction device, which relative position can be adjusted in defined interlocking adjustment positions. The coupling unit has a second interlocking unit which secures a relative position of the adapter element with respect to the coupling unit, which relative position can be adjusted in defined interlocking adjustment positions, wherein, in the second interlocking unit, the distance between directly adjacent interlocking adjustment positions is smaller than the distance between directly adjacent interlocking adjustment positions of the first interlocking unit.

20 Claims, 4 Drawing Sheets

(56) References Cited

U.S. PATENT DOCUMENTS

| | | | |
|---|---|---|---|
| 7,810,219 B2 * | 10/2010 | Lindemann | 24/31 R |
| 2005/0120629 A1 * | 6/2005 | Chang | 49/197 |
| 2008/0200295 A1 * | 8/2008 | Schaefer | 474/255 |

FOREIGN PATENT DOCUMENTS

| | | | |
|---|---|---|---|
| EP | 0543523 A2 | 5/1993 | |
| EP | 2161401 A2 * | 3/2010 | E05F 15/14 |

* cited by examiner

COUPLING SYSTEM OF AN ELEVATOR CAR DOOR DRIVE

FIELD OF THE INVENTION

The invention relates to a coupling system of an elevator car door drive.

BACKGROUND OF THE INVENTION

A cogged belt connector for coupling a cogged belt with an element to be moved, particularly a sliding door for elevators, is known from the specification DE 4414065 C1, wherein the cogged belt connector comprises a detent for producing an interlocking connection with the cogged belt.

SUMMARY OF THE INVENTION

The invention has, in particular, the object of providing a coupling, which is simple to mount, to a traction means with a periodic interlock structure, which enables a simple fine adjustment of the position of the coupling relative to the traction means.

The invention proceeds from a coupling system of an elevator car door drive with a traction means, at least one coupling unit couplable to the traction means, and an adapter element having a first interlock adjustment structure which together with interlock elements of the traction means forms a first interlocked unit, wherein this interlocked unit secures a relative position, which is settable in defined interlocking adjustment positions, of the adapter element with respect to the traction means.

It is proposed that the coupling unit comprises a second interlocked unit which secures a relative position, which is settable in defined interlocking adjustment positions, of the adapter element with respect to the coupling unit, wherein in the second interlocked unit the spacing between directly adjacent interlocking adjustment positions is smaller than the spacing between directly adjacent interlocking adjustment positions of the first interlocked unit. The adapter element together with the traction means is thereby adjustable within the coupling unit advantageously by a distance in traction direction of the traction means which is smaller than a pitch spacing of the interlock elements of the traction means. By "pitch spacing" there is to be understood in this connection, in particular, a smallest spacing between homogenous points of adjacent interlock elements. This allows a fine adjustment of the spacing of the coupling unit in traction direction of the traction means particularly relative to parts of an elevator car door. In a corresponding embodiment of the invention it is possible to dispense with use of screw elements for adjustment, whereby setting of the spacing can be managed in particularly simple manner and an adjustment of the arrangement in the course of operation of the elevator car door drive can advantageously be avoided.

By "interlock" there is to be understood in this connection, in particular, a connection with arises through interengagement of at least two interlock elements. The traction forces, which arise particularly in the traction means, are transmitted in the direction of the surface normals of the interlock elements. By "interlock adjustment structure" there is to be understood in this connection, in particular, an arrangement of interlock elements.

Moreover, it is proposed that the adapter element has at a first surface the first interlock adjustment structure of the first interlocked unit and at a second surface an interlock adjustment structure of the second interlocked unit. A particularly simple assembly of the coupling unit with a traction means with a periodic interlock structure can thereby be achieved. Moreover, a fine adjustment of the position of the traction means relative to the coupling unit can advantageously be made possible without use of screw elements.

In an advantageous embodiment interlock elements of at least one interlock adjustment structure of the second interlocked unit are arranged at periodic spacings, whereby a simple and flexible positional adjustment of the traction means relative to the coupling unit is made possible. By "at periodic spacings" there is to be understood in this connection, in particular, that a spacing between any interlock elements of the interlock adjustment structure is an integral multiple of a smallest spacing between two different interlock elements. In particular, interlock elements can also be omitted at positions which correspond with an integral multiple of a smallest spacing between two different interlock elements without the function of the coupling unit and the concept of the invention being impaired. The interlock elements, which are arranged at periodic spacings, of at least one interlock adjustment structure of the second interlocked unit are preferably shaped-on at the adapter element, whereby a particularly simple assembly of the coupling unit at the traction means and a particularly simple positional adjustment of the traction means relative to the coupling unit can be made possible.

Moreover, it is proposed that the adapter element is of integral construction, whereby by virtue of a small number of components a particularly simple assembly of the coupling unit at the traction means is achieved and the coupling unit can be provided particularly economically. In principle, however, the adapter element can also comprise at least two individual elements and a first individual element can have, at a surface, an interlock structure provided for the purpose of producing together with interlock elements of a traction means an interlocking connection and a second individual element can have, at a surface, an interlock structure with at least one interlock element, the individual elements of the adapter element being able to be connected together in an assembled state by mechanically positive couple, frictional couple or material couple.

In addition, it is proposed that the coupling unit comprises a housing which in an operational state receives the adapter element and the traction means at least in part, whereby a particularly simple assembly of the coupling unit at the traction means is achieved. By "receive the adapter element in part" there is to be understood in this connection, in particular, that in an operational state a surrounding volume formed by external dimensions of the adapter element is disposed at least partly within a volume given by the external dimensions of the housing, and preferably that more than 50% of the surrounding volume of the adapter element is disposed within the volume formed by outer dimensions of the housing.

In a further advantageous embodiment the housing comprises at least one fastening element formed by a recess or a projection, whereby a particularly simple mechanical connection of the coupling unit with other objects, particularly with an elevator car door or other elements mechanically connected with the elevator car door, is made possible. The fastening element can preferably be formed as a passage opening in the housing and the coupling unit fastened by means of a screw which is screwed through the passage opening in another object, particularly an elevator car door.

Moreover, it is proposed that the housing comprises a first support element for supporting the traction means, whereby assembly of the coupling unit with the traction means can be carried out in particularly simple manner.

In addition, it is proposed that the housing comprises a second support element with a shaped-on interlock adjustment structure of the second interlocked unit, which is provided for the purpose of producing together with the further interlock adjustment structure of the second interlocked unit an interlocking connection, whereby assembly of the coupling unit with the traction means and a fine adjustment of the position of the traction means relative to the coupling unit and particularly relative to an elevator car door can be carried out particularly simply.

In an advantageous embodiment the interlock elements of the shaped-on interlock adjustment structure of the second support element of the housing are arranged at periodic spacings at least in sections. A particularly simple and flexible fine adjustment of the position of the traction means relative to the coupling unit and particularly relative to an elevator car door is thereby made possible. In particular, in this regard interlock elements can also be omitted at positions which correspond with an integral multiple of a smallest spacing between two different interlock elements without the function of the coupling unit and the concept of the invention being impaired.

It is proposed that the housing comprises a cover unit which is removable for assembly, whereby a simple assembly of the coupling unit with the traction means and a simple adjustment of the position of the traction means relative to the coupling unit is made possible. The cover unit can, for closing off the assembly, preferably be fastened by means of screws to a side of the coupling unit. With particular advantage the cover unit can, when the traction means and adapter element are inserted into the housing of the coupling unit, be placed on the adapter element in direction from the front and mounted by compressing the cover unit and the rest of the housing by means of spring elements. The spring elements required for such a mounting are familiar to the expert.

Moreover, it is proposed that the housing has two substantially L-shaped profiles as considered in longitudinal direction of a traction means receiving region of the housing. Not only a particularly simple assembly, but also an economic solution for the coupling element can thereby be achieved.

In an advantageous embodiment the traction means is constructed as a cogged belt, whereby by virtue of an expanded use of cogged belts an economic solution of a coupling system can be provided. The interlock elements formed as teeth of the cogged belt are preferably arranged on the inner side of the cogged belt. In particular, the coupling unit is preferably provided for the purpose of producing, in the case of an endless cogged belt cut to length, a connection of two ends of the cogged belt by a coupling.

Moreover, it is proposed that the adapter element is produced at least substantially of light metal or synthetic material. By "light metal" there is to be understood in this connection, in particular, a metal with a mass density of less than 5.0 g/cm$^3$. A particularly economic solution with a long service life can thereby be provided. By "substantially" there is to be understood in this connection, in particular, that a volume proportion of the adapter element consists of at least 60% of light metal or synthetic material. By "at least substantially" there is to be understood in this connection, in particular, that the adapter can also exclusively consist of light metal or synthetic material.

Moreover, it is proposed that the interlock adjustment structure of the second interlocked unit has a toothing with notch flanks. By "toothing with notch flanks" there is to be understood in this connection that the interlock elements of the interlock adjustment structure have flanks which are formed as straight lines standing at an angle relative to one another which advantageously is greater than 10° and smaller than 135°.

An elevator car door drive is proposed which comprises at least one coupling system. Through the provided simple adjustment possibility of the position of the traction means relative to the coupling unit of the coupling system it is possible to achieve a very simple and precise closing of single-leaf and double-leaf centrally closing and telescopically closing elevator car doors with use of widely available, economic traction means.

DESCRIPTION OF THE DRAWINGS

Further advantages are evident from the following drawing description. Exemplifying embodiments of the invention are illustrated in the drawing. The description and the claims contain numerous features in combination. The expert will advantageously also consider the features individually and combine them into feasible further combinations.

DETAILED DESCRIPTION OF THE INVENTION

Figure 1:
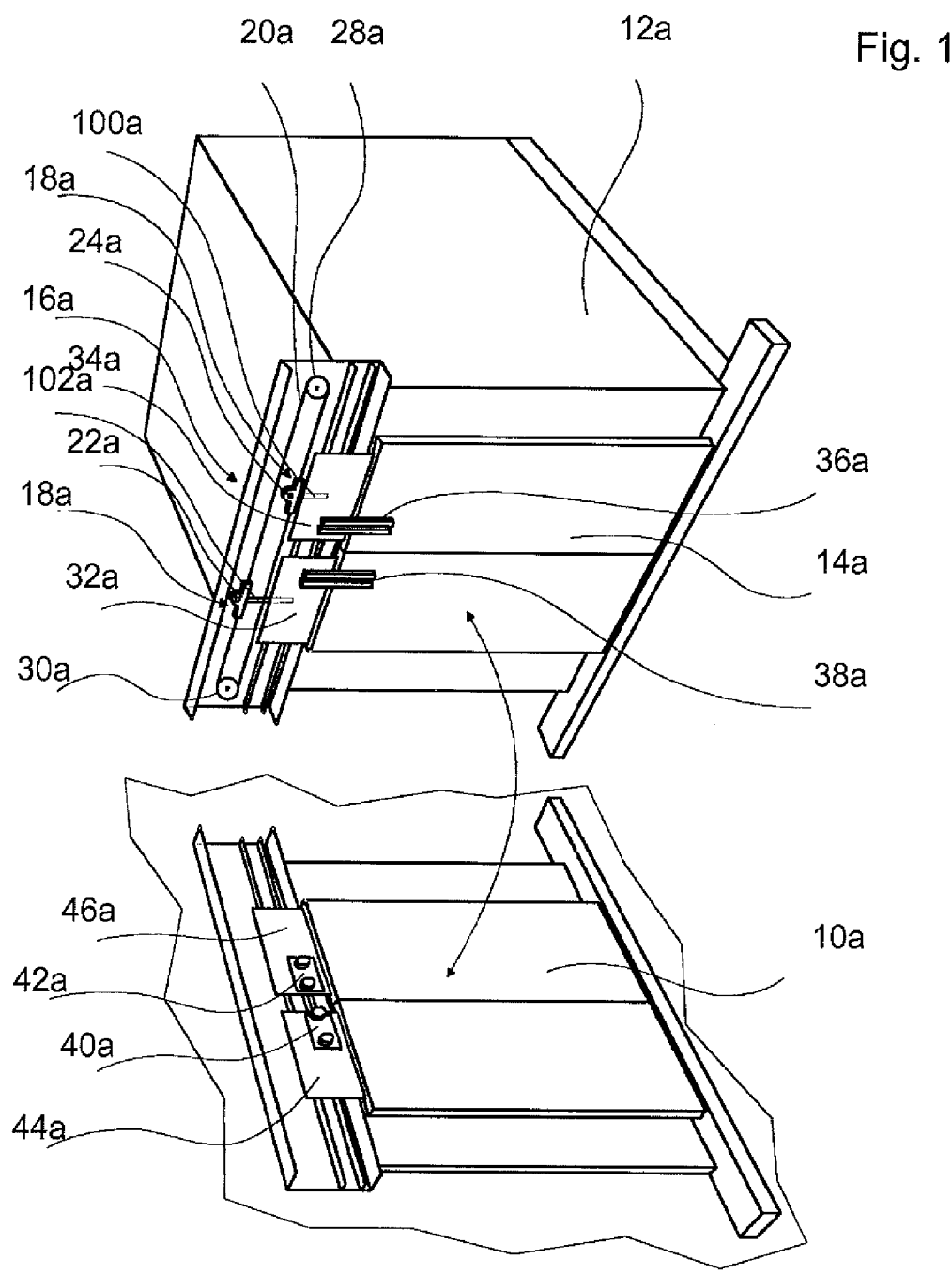
FIG. 1 shows a view of a shaft door and an elevator car with an elevator car door drive.

Alternative exemplifying embodiments are illustrated in FIGS. 1 to 4 as well as 5, 6, 7, 8 and 9. Components, features and functions remaining substantially the same are basically enumerated by the same references numerals. However, in order to distinguish the exemplifying embodiments the letters a to f are added to the reference numerals of the exemplifying embodiments, wherein with respect to components, features and functions remaining the same reference can be made to the description of the exemplifying embodiment of FIGS. 1 to 4.

A view of a floor in a building with a shaft door 10a is illustrated in FIG. 1 in the left-hand part and an elevator car 12a with a double-leaf centrally closing elevator car door 14a is illustrated in FIG. 1 in the right-hand part. For reasons of clarity, the illustration is selected as if the arrangement of elevator car 12a and shaft door 10a would have folded together towards both sides by means of a hinge extending perpendicularly to the center of the figure.

An elevator car door drive 16a arranged above the elevator car door 14a comprises a coupling system 18a with a traction means 20a, which is constructed as a cogged belt and which is laid around a drive roller 28a and a deflecting roller 30a. Arranged at plate-shaped projections 32a, 34a (door leaf carriage) of the elevator car door 14a are respective entrainer elements 36a, 38a which are provided for the purpose of engaging in corresponding slide elements 40a, 42a at projections 44a, 46a of the shaft door 10a in the operational state. During opening of the elevator car door 14a by means of the elevator car door drive 16a the shaft door 10a is similarly opened in known manner by the entrainer elements 36a, 38a. In the case of a traction means 20a with periodically arranged interlock elements 50a (FIG. 2) a position of the coupling unit 22a, 24a relative to the projections 32a, 34a of the elevator car door 14a does not, when the elevator car door 14a is precisely closed, necessarily correspond with a position predetermined by the periodically arranged interlock elements 50a, whereby a need for fine adjustment arises which is smaller than a smallest spacing 48a between two different interlock elements 50a of the traction means 20a.

The projections 32a, 34a of the elevator car door 14a in FIG. 1 are respectively connected by a coupling unit 22a, 24a, which is coupled to the traction means 20a. Each coupling unit 22a, 24a comprises an adapter element 26a (FIG. 2), which has a first interlock adjustment structure 54a with interlock elements 52a which in an operational state form together with an interlock adjustment structure 56a, which is formed by interlock elements 50a, of the traction means 20a a first interlocked unit 58a. Each coupling unit 22a, 24a comprises a second interlocked unit 60a provided for the purpose of securing a relative position, which is adjustable with respect to a first support element 76a of the coupling unit (22a, 24a), of the adapter element 26a. This second interlocked unit 60a has a smallest spacing 62a of two different interlocking adjustment positions which is smaller than a smallest spacing 48a of two different interlocking adjustment positions of the first interlocked unit 58a, whereby a fine adjustment of the position of the traction means 20a relative to the coupling unit 22a, 24a is made possible.

Figure 2:
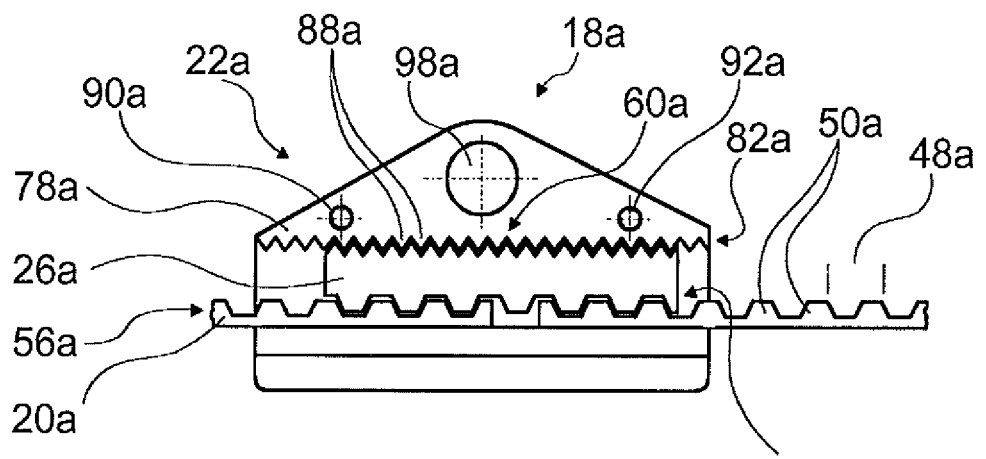
FIG. 2 shows a front view of a coupling system of the elevator car door drive of FIG. 1 with a coupling unit (without cover unit) and a traction means in operational state.
Figure 3:
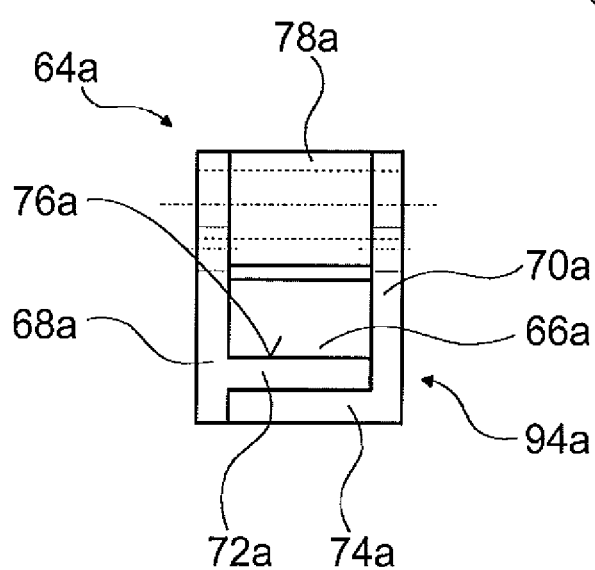
FIG. 3 shows a side view of the coupling unit of FIG. 2 with cover unit, but without adapter element and traction means.
Figure 4:
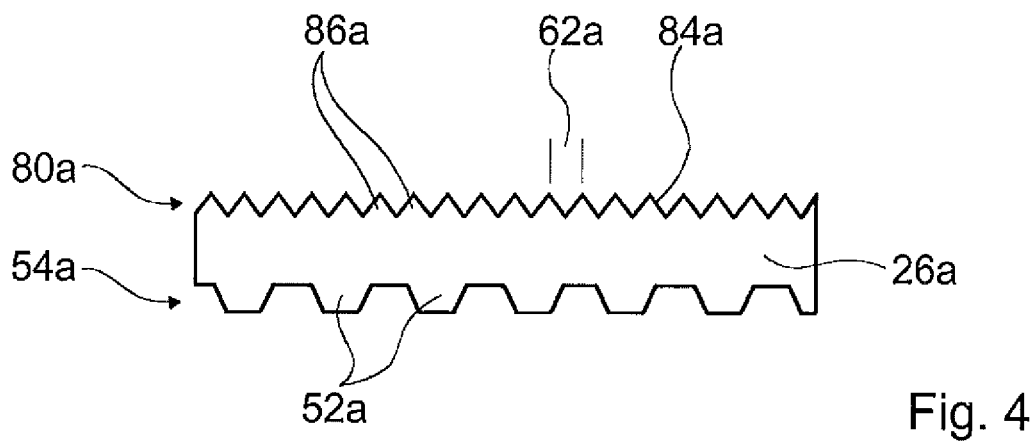
FIG. 4 shows a detail view of the adapter element of FIG. 2.

A coupling unit 22a of FIG. 1 is illustrated in detail in FIG. 2 and FIG. 3. The coupling unit 22a comprises a housing 64a which, considered in longitudinal direction of a traction means receiving region 66a of the housing 64a, has two substantially L-shaped profiles 68a, 70a (FIG. 3), the transverse struts 72a, 74a of which are arranged to be offset relative to one another. A cover unit 94a, which for reasons of clarity is not shown in FIG. 2, comprises one of the two L-shaped profiles 70a and two screw elements 90a, 92a, by means of which the two L-shaped profiles 68a, 70a are connected together. Moreover, the housing 64a comprises an integrally formed adapter element 26a (FIG. 4) which has as a first surface the interlock adjustment structure 54a, which is formed by interlock elements 52a, of the first interlocked unit 58a for interlocking with an interlock adjustment structure 56a, which is formed by interlock elements 50a constructed as teeth of a cogged belt, of a traction means 20a so that when the traction means 20a is driven forces are transmitted in effective manner in the direction of movement of the traction means 20a to the coupling unit 22a. In an operational state the housing 64a receives the adapter element 26a and the traction means 20a as illustrated at least partly in FIG. 2. The traction means 20a and the adapter element 26a are supported from below by the first support element 76a of the housing 64a. Shaped-on at a second surface of the adapter element 26a at the upper side is an interlock adjustment structure 80a of the second interlocked unit 60a, which is constructed as a toothing of notched flanks 84a. The housing 64a comprises a second support element 78a with a shaped-on interlock adjustment structure 82a of the second interlocked unit 60a, which is provided for the purpose of producing together with the interlock adjustment structure 80a on the second surface of the adapter element 26a an interlocking connection. The two interlock adjustment structures 80a, 82a of the second interlocked unit 60a are arranged at periodic spacings. Different relative positions between adapter element 26a and traction means 20a on the one hand and the coupling unit 22a on the other hand are settable between the interlock adjustment structure 80a of the adapter element 26a and the interlock adjustment structure 82a of the second support element 78a of the housing 64a by the given variants for producing an interlocking connection.

Further embodiments of the second interlocked unit 60b-60e are illustrated in FIGS. 5 to 8 in each instance by an interlock adjustment structure 80b-80e of the adapter element 26b-26e and an interlock adjustment structure 82b-82e at the support element 78b-78e of the housing. Also shown are a traction means or device 20b, interlock elements 52b-52e, a spacing 62b-62e, a housing 64b-64e, interlock elements 86b-86e, and interlock elements 88b-88e. The adapter element 26b-26e is in all embodiments made from an aluminum-magnesium-silicon alloy consisting of more than 90% of—and therefore substantially—aluminum.

Figure 5:
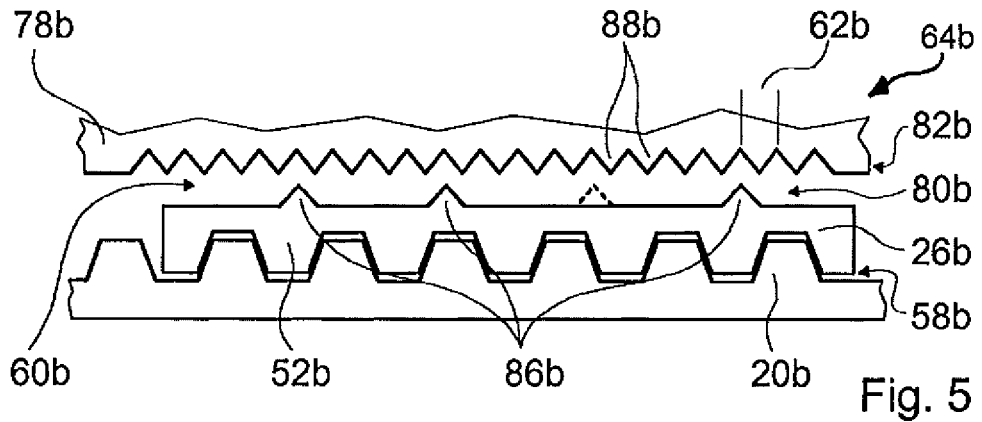
FIG. 5 shows a further form of embodiment of an adapter element.

FIG. 5 corresponds with an interlock adjustment structure 82b at a support element 78b of a housing 64b of that of FIG. 2. An interlock adjustment structure 80b of a second interlock unit 60b at an adapter element 26b comprises three interlock elements 86b at periodic spacings. All spacings of the three interlock elements 86b amount to a multiple of a smallest spacing 62b between two different interlock elements 88b of the interlock adjustment structure 82b at the support element 78b of the housing 64b. For clarification of a periodicity an interlock element 86b omitted in the embodiment is indicated by a dashed line.

Figure 6:
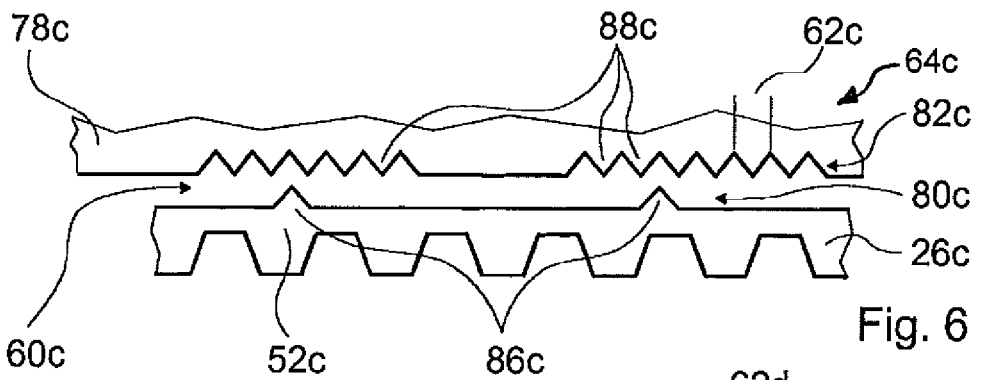
FIG. 6 shows a further form of embodiment of an adapter element.

Interlock elements 88c of a shaped-on interlock adjustment structure 82c of a second support element 78c of a housing 64c are shaped on in two sections at periodic spacings in FIG. 6. Here, too, all possible spacings between interlock elements 88c of the shaped-on interlock adjustment structure 82c at the support element 78c of the housing 64c not only within the sections, but also between interlock elements 88c of different sections correspond with a multiple of a smallest spacing 62c between two different interlock elements 88c of the interlock adjustment structure 82c.

Figure 7:
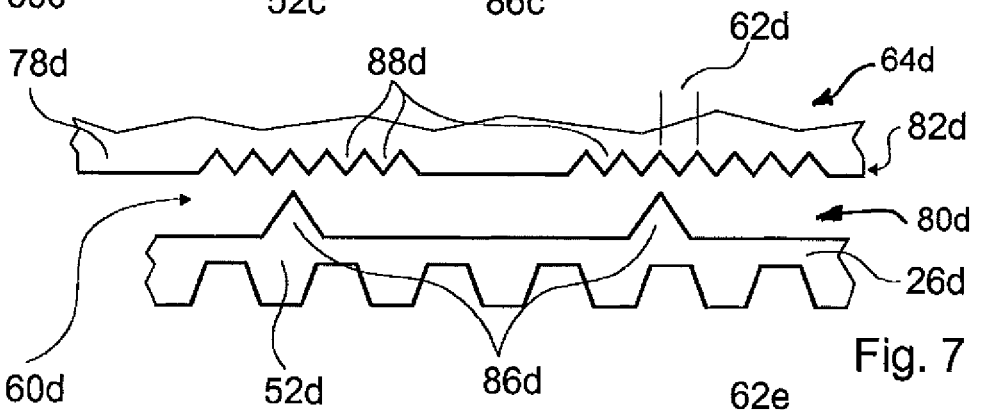
FIG. 7 shows a further form of embodiment of an adapter element.

By contrast to FIG. 6, in FIG. 7 interlock elements 86d of an interlock adjustment structure 82d of a second interlocked unit 60d of the adapter element 26d are formed in such a manner that only an upper part of the two interlock elements 86d produces an interlocking connection.

Figure 8:
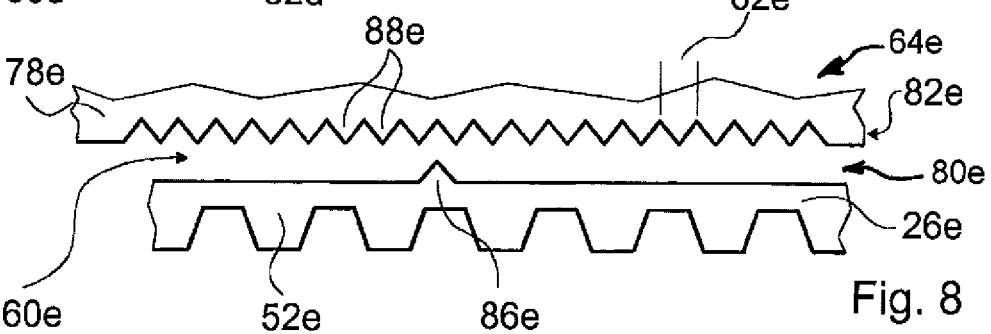
FIG. 8 shows a further form of embodiment of an adapter element.

FIG. 8 comprises a second interlocked unit 60e, a single interlock element 86e in a first interlock adjustment structure 80e on a second surface of an adapter element 26e and a second interlock adjustment structure 82e at a second support element 78e of a housing 64e with continuously arranged interlock elements 88e.

The exemplifying embodiments illustrated in FIGS. 5 to 8 serve for clarification of a possible realization of the invention and are not in any circumstances to be regarded as a definitive listing.

In order to assemble the coupling system 18a of FIG. 2 the interlock between the first interlock adjustment structure 54a of the adapter element 26a and the cogged belt or, as illustrated in FIG. 2, two free ends of an endless cogged belt cut to length is produced. Fixing of a desired relative position of the traction means 20a within the coupling unit 22a is carried out by producing the second interlocked unit 60a between interlock elements 86a of an interlock adjustment structure 80a of the adapter element 26a and interlock elements 88a of an interlock adjustment structure 82a at the second support element 78a of the housing 64a. In this arrangement the desired relative position is already produced without use having been made of a screw element. For closure, a cover unit 94a, which is removable for assembly, of the housing 64a is placed on from the front and held in position by means of two associated screw elements 90a, 92a.

Each mounted coupling unit 22a, 24a of FIG. 1 is mechanically connected by a screw element at a fastening element 98a (see FIG. 2), which is formed as a recess—which has the form of a passage opening—of the housing 64a, with a connecting element 100a, 102a which is respectively arranged at one of the plate-shaped projections 32a, 34a (door leaf carriage) of the elevator car door 14a of FIG. 1.

Figure 9:
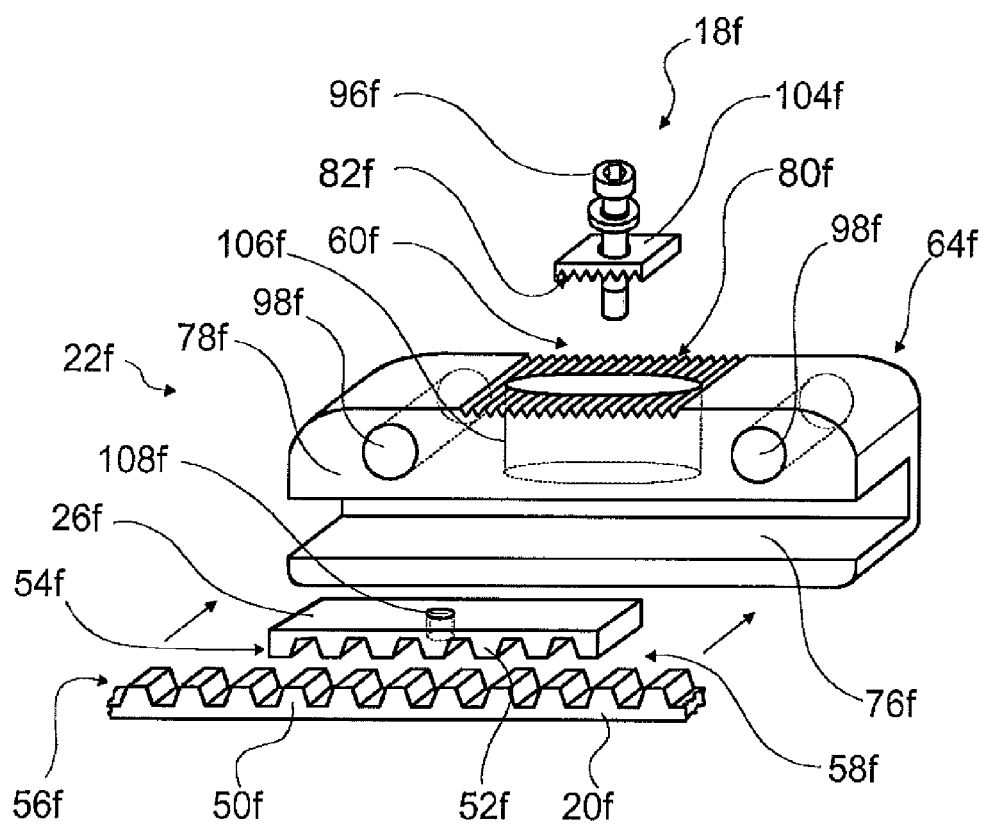
FIG. 9 shows a further embodiment of a coupling system.

FIG. 9 shows a further embodiment of a coupling system 18f with a coupling unit 22f. An adapter element 26f comprises a first interlock adjustment structure 54f with interlock elements 52f, which in an operational state form together with an interlock adjustment structure 56f, which is formed by interlock elements 50f, of a traction means 20f a first interlocked unit 58f. By contrast to the previous forms of embodiment, a coupling unit 22f comprises a second interlocked unit 60f at its upper side. A first interlock adjustment structure 80f of the second interlocked unit 60f is shaped-on at a surface at the upper side of a housing 64f. A second interlock adjustment structure 82f of the second interlocked unit 60f is constructed in the form of an apertured mounting plate 104f. After production of an interlock between the first interlock adjustment structure 54f at a first surface of the adapter element 26f and the traction means 20f, which is constructed as a cogged belt, or two free ends of an endless cogged belt cut to length the interlocked unit 58f consisting of the traction means 20f and the adapter element 26f is arranged on a first support element 76f of the housing 64f. A screw element 96f with shaped-on thread engages through the apertured mounting plate 104f and through a recess 106f, which is formed in the upper side of the housing 64f, in the form of a slot in a threaded bore 108f arranged at a second, otherwise planar surface of the adapter element 26f. In a selected setting of the screw element 96f a displacement of the adapter element 26f and production of a desired position of the interlocked unit 60f within the coupling unit 22f is made possible and is fixed by a deeper setting of the screw element 96f. It is to be particularly emphasized that the screw element 96f is provided for the purpose of securing the second interlocked unit 60f. A frictional couple by strong tightening of the screw element 96f is of subordinate significance insofar as the interlocked unit 60f of the two interlock adjustment structures 80f, 82f is in place, so that possible loosenings of the screw element 96f during operation of the elevator car door drive 16f do not influence the functioning thereof.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A coupling system for an elevator car door drive including a traction means, a coupling unit that can be coupled to the traction means and an adapter element having a first interlock adjustment structure that cooperates with interlock elements of the traction means to form a first interlocked unit, wherein the first interlocked unit secures a relative position, which is settable in defined interlocking adjustment positions, of the adapter element with respect to the traction means, comprising:
a second interlocked unit included in the coupling unit that secures a relative position, which is settable in defined interlocking adjustment positions, of the adapter element with respect to the coupling unit, wherein at said second interlocked unit a second spacing between directly adjacent interlocking adjustment positions is smaller than a first spacing between directly adjacent interlocking adjustment positions of the first interlocked unit, and wherein the first interlock adjustment structure and the interlock elements of the traction means are coupled by positive interlocking and the adapter element and the coupling unit are coupled by positive interlocking.

2. The coupling system according to claim 1 wherein the adapter element has at a first surface at which the first interlock adjustment structure of the first interlocked unit is positioned and a second surface at which an interlock adjustment structure of said second interlocked unit is positioned.

3. The coupling system according to claim 1 wherein said second interlocked unit has at least one interlock adjustment structure with interlock elements that are arranged at periodic spacings.

4. The coupling system according to claim 1 wherein the adapter element is of integral construction.

5. The coupling system according to claim 1 wherein the coupling unit includes a housing which in an operational state at least partly receives the adapter element and the traction means.

6. The coupling system according to claim 5 wherein said housing includes a traction means support element for supporting the traction means.

7. The coupling system according to claim 5 wherein said housing includes an interlock support element with a shaped-on interlock adjustment structure of said second interlocked unit for an interlocking connection with an interlock adjustment structure of said second interlocked unit.

8. The coupling system according to claim 7 wherein interlock elements of said shaped-on interlock adjustment structure of said interlock support element of said housing are positioned at periodic spacings in at least one section.

9. The coupling system according to claim 5 wherein said housing has two substantially L-shaped profiles extending in a longitudinal direction of a traction means receiving region of said housing, said traction means receiving region receiving the traction means.

10. The coupling system according to claim 5 wherein said housing includes at least one fastening element for connecting to a connecting element of the elevator car door drive.

11. The coupling system according to claim 10 wherein said at least one fastening element is a recess formed in said housing.

12. The coupling system according to claim 1 wherein the traction means is constructed as a cogged belt.

13. The coupling system according to claim 1 wherein the adapter element is formed at least at least partly of a light metal or a synthetic material.

14. The coupling system according to claim 1 wherein said second interlocked unit has at least one interlock adjustment structure with a toothing formed with notch flanks.

15. An elevator car door drive including a coupling system, the coupling system comprising:
a traction means;
a coupling unit that can be coupled to the traction means; and
an adapter element having a first interlock adjustment structure that cooperates with interlock elements of the traction means to form a first interlocked unit, wherein the first interlocked unit secures a relative position, which is settable in defined interlocking adjustment positions, of the adapter element with respect to the traction means, comprising a second interlocked unit included in the coupling unit that secures a relative position, which is settable in defined interlocking adjustment positions, of the adapter element with respect to the coupling unit, wherein at said second interlocked unit a second spacing between directly adjacent interlocking adjustment positions is smaller than a first spacing between directly adjacent interlocking adjustment positions of the first interlocked unit, and wherein the first interlock adjustment structure and the interlock elements of the traction means are coupled by positive interlocking and the adapter element and the coupling unit are coupled by positive interlocking.

16. A coupling system for an elevator car door drive including a traction means and a coupling unit that can be coupled to the traction means and connected to an elevator car door, comprising:

an adapter element having a first interlock adjustment structure that couples with interlock elements of the traction means by positive interlocking to form a first interlocked unit, wherein said first interlocked unit secures a relative position, which is settable in defined interlocking adjustment positions, of said adapter element with respect to the traction means; and a second interlocked unit that secures a relative position, which is settable in defined interlocking adjustment positions, of said adapter element with respect to the coupling unit, wherein at said second interlocked unit a second spacing between directly adjacent interlocking adjustment positions is smaller than a first spacing between directly adjacent interlocking adjustment positions of said first interlocked unit and said adapter element and the coupling unit are coupled by positive interlocking.

17. The coupling system according to claim 16 wherein said adapter element has at a first surface at which the first interlock adjustment structure of the first interlocked unit is positioned and a second surface at which an interlock adjustment structure of said second interlocked unit is positioned.

18. The coupling system according to claim 16 wherein the coupling unit includes a housing which in an operational state at least partly receives said adapter element and the traction means.

19. The coupling system according to claim 18 wherein said housing includes a support element with a shaped-on interlock adjustment structure of said second interlocked unit for an interlocking connection with an interlock adjustment structure of said second interlocked unit.

20. The coupling system according to claim 18 wherein said housing has two substantially L-shaped profiles extending in a longitudinal direction of a traction means receiving region of said housing.

* * * * *